(12) United States Patent
Cooper

(10) Patent No.: US 6,729,065 B2
(45) Date of Patent: May 4, 2004

(54) FISHING SYSTEM

(76) Inventor: Herbert Cooper, 1965 S. Ocean Dr. No. 9-R, Hallandale, FL (US) 33009

( * ) Notice: Subject to any disclaimer, the term of this patent is extended or adjusted under 35 U.S.C. 154(b) by 0 days.

(21) Appl. No.: 10/091,078

(22) Filed: Mar. 5, 2002

(65) Prior Publication Data
US 2003/0167674 A1 Sep. 11, 2003

(51) Int. Cl.$^7$ ............................................. A01K 91/00
(52) U.S. Cl. ....................................................... 43/27.4
(58) Field of Search ........................................... 43/27.4

(56) References Cited

U.S. PATENT DOCUMENTS

| | | | |
|---|---|---|---|
| 4,043,074 A | * | 8/1977 | Airhart ........................ 43/18.5 |
| 4,388,774 A | | 6/1983 | Thoemke |
| 4,813,171 A | | 3/1989 | Cooper et al. |
| 5,140,925 A | | 8/1992 | Tyring |
| 5,140,928 A | * | 8/1992 | Frick ........................... 114/255 |
| 5,243,927 A | | 9/1993 | Messick |
| 5,245,780 A | | 9/1993 | Hansen et al. |
| 5,445,102 A | * | 8/1995 | Rupp ........................... 114/255 |
| 5,921,196 A | * | 7/1999 | Slatter ......................... 114/255 |

* cited by examiner

Primary Examiner—Charles T. Jordan
Assistant Examiner—Bret Hayes
(74) Attorney, Agent, or Firm—Laurence A. Greenberg; Werner H. Stemer; Ralph E. Locher

(57) ABSTRACT

A fishing system is described that is mounted to a boat. The fishing system has a housing, a mast supported in the housing, and a first actuator connected to and rotating the mast. The first actuator is mounted on the housing. A second actuator is connected to and pivots the housing. By turning on the second actuator, the mast can be raised or lowered, as needed.

22 Claims, 4 Drawing Sheets

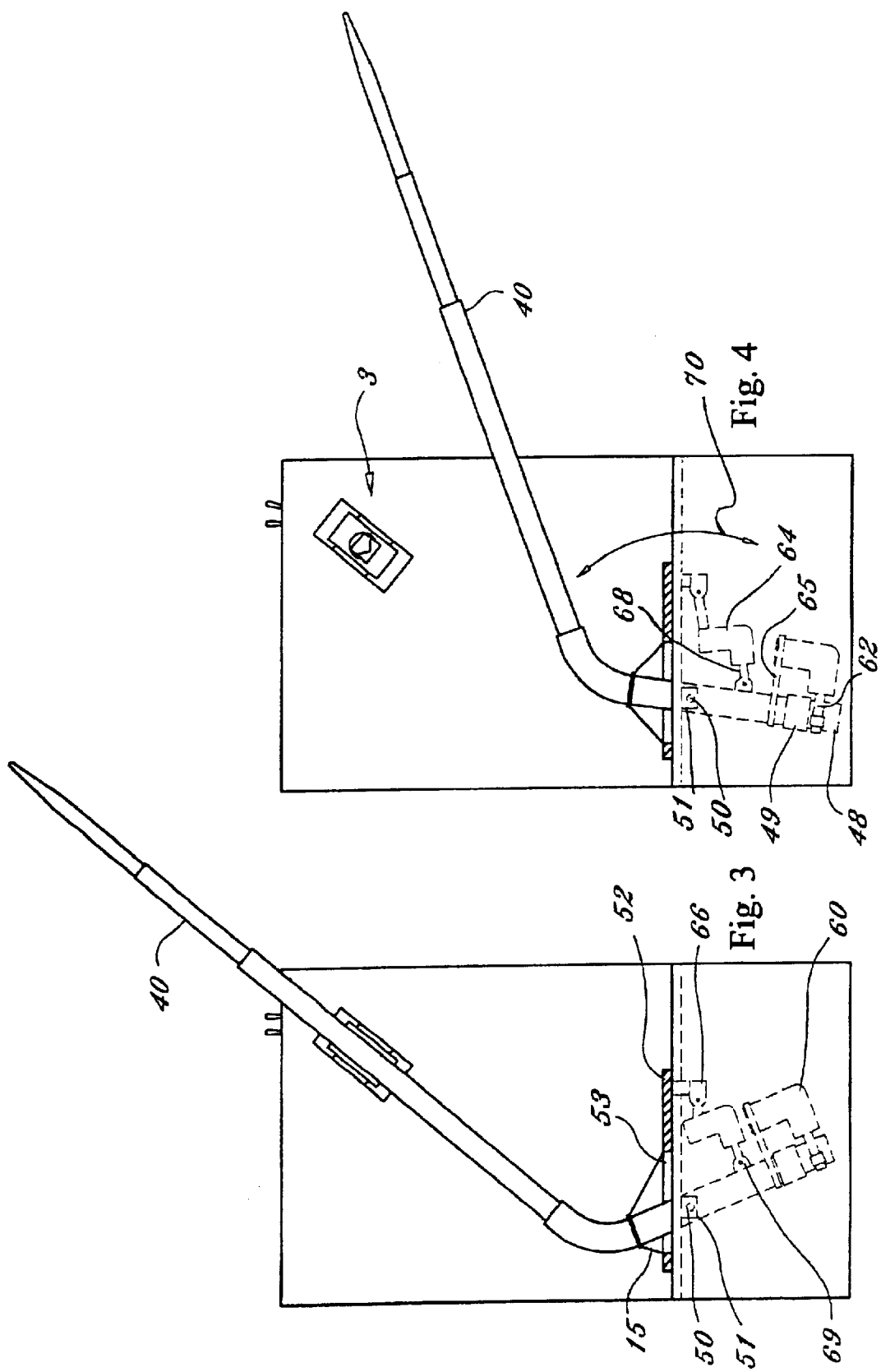

FISHING SYSTEM

BACKGROUND OF THE INVENTION

1. Field of the Invention

The invention relates, generally, to a fishing system, and more specifically, it relates to a fishing system to be attached to a boat and formed of an outrigger, a locking mechanism, and control electronics.

2. Description of the Related Art

Improvements have been made in fishing outriggers in the past. U.S. Pat. No. 4,388,774 discloses a system for extending fishing rods on beams beyond the sides of a boat by use of a winch.

U.S. Pat. No. 4,813,171 teaches a power-operated lateral actuator for a fishing outrigger. The outrigger is connected to the hull of the boat in two locations and is attached to two pivot/rotation points. A power-operated actuator is provided for moving the mast between a retracted position and an extended position. A manually operated circular block with a concentric plate is connected to the side of the boat. The outrigger can be manually rotated by removing a pin and rotated about the circular block. The removal of the pin and the physical rotation of the outrigger are done manually. In addition, the beams, brackets, and other parts for controlling and moving the outrigger are quite complex.

U.S. Pat. No. 5,243,927 teaches an outrigger mounted by a vertical tubular housing having a top plate and a bottom plate to an outside cabin bulkhead of a boat. The vertical tubular housing contains a hydraulic fluid cylinder to propel a piston car assembly for raising and lowering the outrigger. The outrigger is further guided by a collapsible strut mounted to the boat on one end and to the outrigger on the other end. The outrigger taught in U.S. Pat. No. 5,243,927 is quite complex and expensive to manufacture.

The mast of most prior art outriggers is formed from aluminum. Because of the weight of the aluminum mast, guide wires are connected between a base portion of the mast and/or boat and upper portions of the mast to provide structural support to the upper portions of the mast. In addition, the mast of the outrigger is flexed during fishing operations and the mast must be built to withstand the constant bending and springing back.

SUMMARY OF THE INVENTION

It is accordingly an object of the invention to provide a fishing system, which overcomes the herein-mentioned disadvantages of the heretofore-known devices of this general type, which provides an automatically operable outrigger that is less complex and easier to operate.

With the foregoing and other objects in view there is provided, in accordance with the invention, a fishing system to be mounted to a boat. The fishing system contains a housing, a mast disposed in the housing, and a first actuator connected to and rotating the mast. The first actuator is mechanically connected to and supported by the housing. A second actuator is connected to and pivots the housing for raising and lowering the mast.

In accordance with an added feature of the invention, a holding plate is to be physically attached to the boat. The housing is pivotably mounted in the holding plate such that the mast can be raised and lowered by the second actuator. The holding plate has bearing journals, and the housing has trunions supported by and rotatable within the bearing journals such that the housing is pivotable. The second actuator is coupled to the holding plate.

In accordance with another feature of the invention, a locking mechanism is provided for securing the mast. The locking mechanism is to be attached to the boat, and the mast has a clasping mechanism engaged and secured by the locking mechanism. The mast is formed from carbon fiber. The mast can be formed in three parts, including a first part, a second part and a third part, which are telescopically connected to each other such that in a first position the third part is extendable from and locked to the second part and in a second position the third part is partially retracted into the second part. In a third position the second part is extendable from and locked to the first part and in a fourth position the second part is partially retracted into the first part.

In accordance with a further feature of the invention, the first actuator and the second actuator are electrical actuators, in particular they are solenoids.

In accordance with an additional feature of the invention, a base part is provided and has a first end connected to the mast and a second end rotatably supported in the housing. The first actuator is connected to and rotates the base part resulting in the rotation of the mast.

The locking mechanism has a base secured to the boat, a pivotable body pivotable mounted in the base, a third actuator with a pin mounted on the base, and a clasping mechanism extending from the pivotable body and engaging the clasping mechanism of the mast. When actuated the pin of the third actuator pivots the pivotable body such that the clasping mechanism of the locking mechanism disengages from the clasping mechanism of the mast. The locking mechanism has a spring disposed between the base and the pivotable body for biasing the pivotable body to a locked position. The clasping mechanism is part of an adjustable arm adjustable connected to the pivotable body. The adjustable arm has a threaded end and the pivotable body has a threaded end for receiving the threaded end of the adjustable arm. In this manner, the adjustable arm can be moved to and from the pivotable body.

In accordance with a further feature of the invention, a clamp is provided and has a first end connected to the holding plate and a second end supporting the second actuator.

In accordance with a further additional feature of the invention, the holding plate has an opening formed therein and the housing projects through the opening. A cover surrounds the housing above the opening in the holding plate. The cover is formed of a flexible material.

In accordance with a further feature of the invention, at least two eyelets are disposed on the mast for guiding a line, rope or wire.

In accordance with a feature of the invention, the first actuator has a first clasping arm connected to the base part and a second clasping arm connected to and supported by the gimble tube.

In accordance with a concomitant feature of the invention, the mast is formed of three parts that are telescopically connected to each other. Each of the three parts have rigidity and flexibility properties that are different due to different compositions of the carbon fiber forming the three parts.

Other characteristic features of the invention are set forth in the appended claims.

Although the invention is illustrated and described herein as embodied in a fishing system, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

BRIEF DESCRIPTION OF THE DRAWINGS

FIG. 3 is a front elevational view of the fishing system with the outrigger in the locked position;

FIG. 4 is a front elevational view of the fishing system with the outrigger in a lowered position;

DESCRIPTION OF THE PREFERRED EMBODIMENTS

Figure 2:
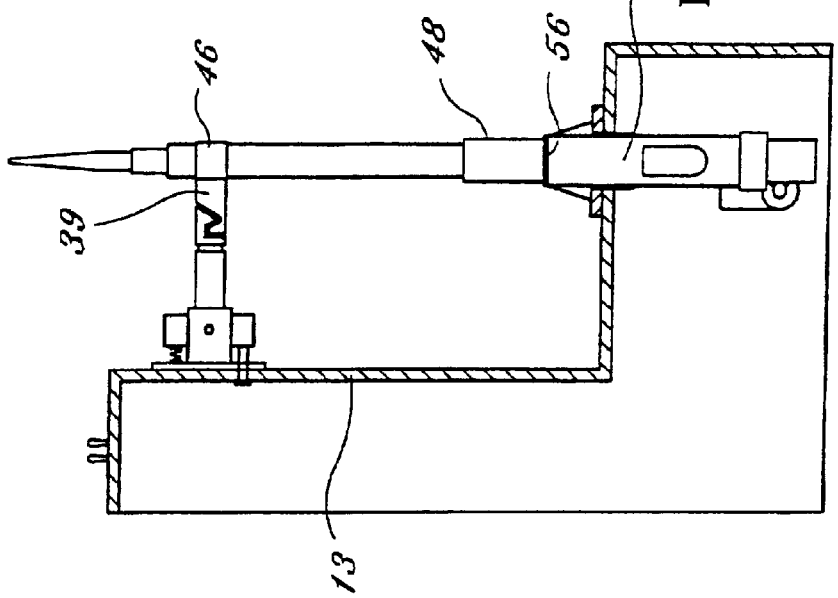
FIG. 2 is a sectional view of the fishing system with the outrigger in a locked position and a mast in a retracted position.
Figure 1:
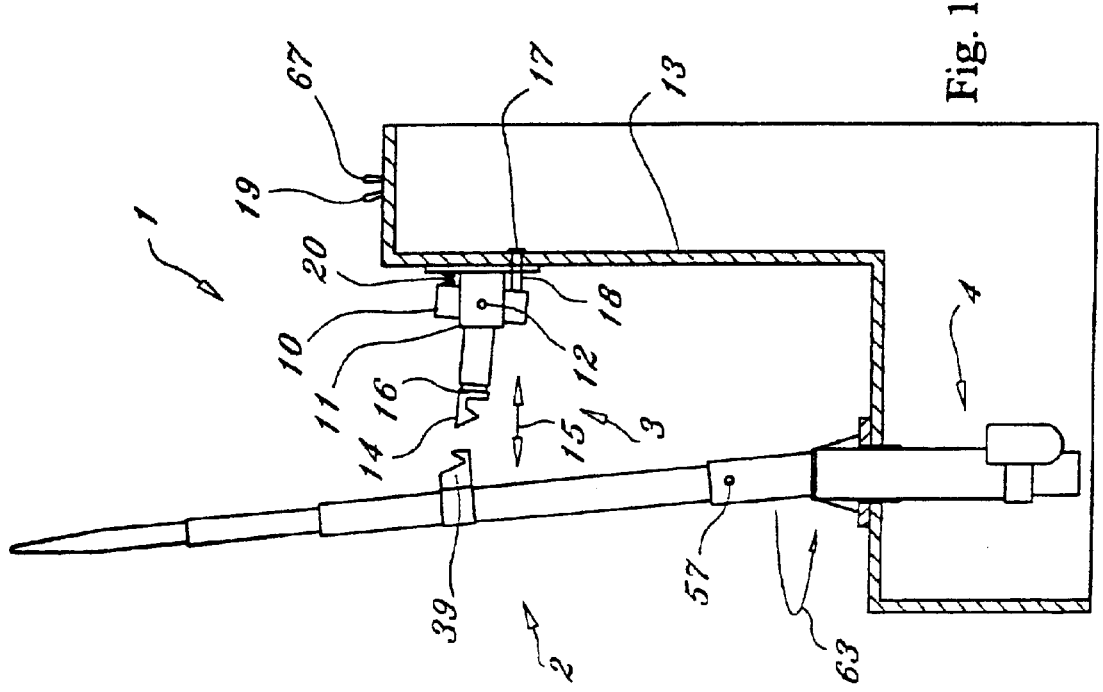
FIG. 1 is a diagrammatic, sectional view of the fishing system having an outrigger in an unlocked position.

In all the figures of the drawing, sub-features and integral parts that correspond to one another bear the same reference symbol in each case. Referring now to the figures of the drawings in detail and first, particularly, to FIGS. 1 and 2 thereof, there is shown a fishing system 1 formed of an outrigger 2, a locking mechanism 3, and control electronics 4 (shown only diagrammatically in FIGS. 1 and 2). In FIG. 1, the outrigger 2 is released from the locking mechanism 3. In contrast, FIG. 2 shows the outrigger 2 in a locked position.

The locking mechanism 3 is formed of a pivotable body 10 pivotable about a base 11 having a pivot point 12. The base 11 is to be secured to a body 13 of a boat. Attached at an end of the pivotable body 10 is an adjustable arm 14 that has threads for screwing into threads disposed at an end of the pivotable body 10. In this manner, a position of the adjustable arm 14 is adjustable in the direction of the double-headed arrow 15 as the adjustable arm 14 can be threaded to a desired position. Instead of threads, other methods of providing the adjustable arm 14 are possible such as a telescopic arm.

The adjustable arm 14 has a clasping mechanism 16 for engaging a clasping mechanism 39 of the outrigger 2 for holding the outrigger 2 in a locked position. The locking mechanism 3 has an actuator 17 with a pin 18 that pushes forward into the pivotable body 10 when the actuator 17 is actuated by a switch 19. Due to the actuation of the actuator 17 the pivotable body 10 pivots about the pivot point 12 in such a manner that the clasping mechanism 16 of the locking mechanism 3 is raised and released from the clasping mechanism 39 of the outrigger 2. The locking mechanism 3 has a spring 20 for biasing the adjustable arm 14 in the locked position.

Figure 5:
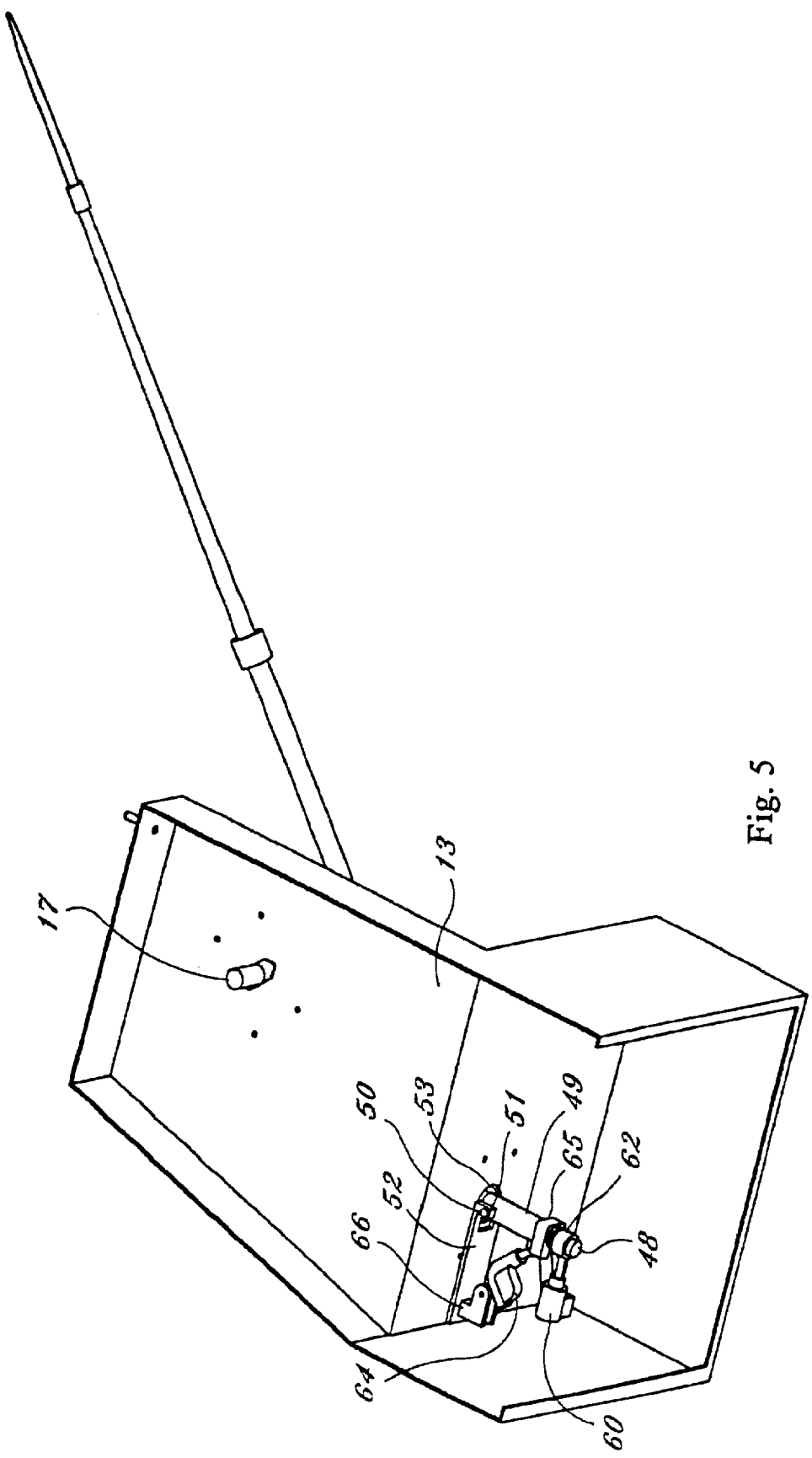
FIG. 5 is a rear, perspective view showing the interconnection of the actuators for moving the outrigger.
Figures 6, 7:
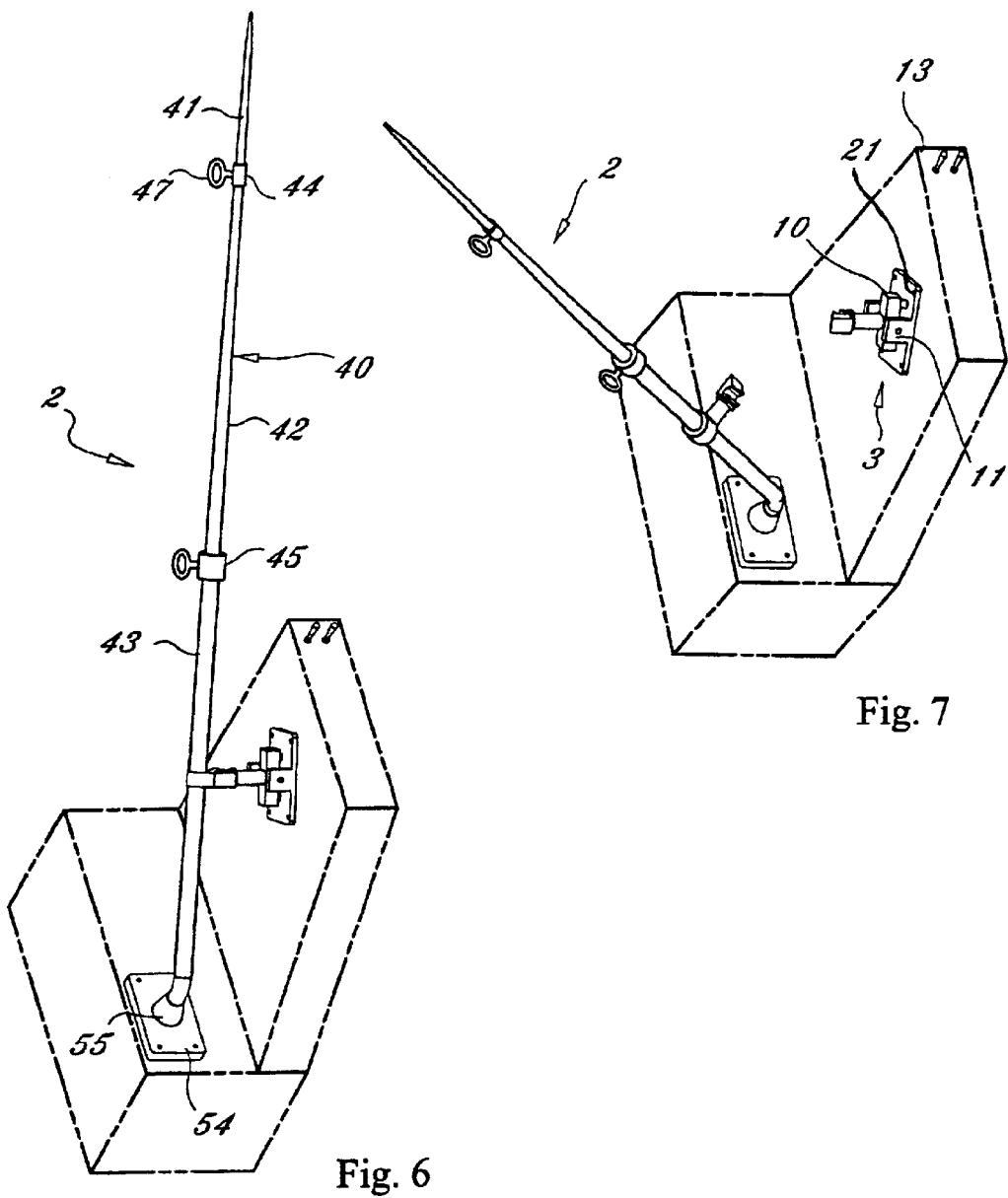
FIGS. 6 and 7 are perspective views of the fishing system.

It is noted that the locking mechanism 3 can be manually operated and the actuator 17 can be dispensed with. In the manual mode, the pivotable body 10 is grabbed by the operator and the clasping mechanism 16 is lifted out of the locked position for releasing the outrigger 2. FIGS. 6 and 7 show a perspective view of the locking mechanism 3. It is noted that the base 11 is fastened to the boat body 13 by fasteners 21 such as screws, rivets, and bolts. FIG. 5 shows a rear perspective view of the actuator 17 on the inside of the boat body 13.

FIGS. 6 and 7 show that the outrigger 2 has a mast 40. The mast 40 is formed of three extendable portions 41, 42, 43. The extendable portions 41–43 lock into each other at connection points 44, 45. The extendable portions 41–43 are therefore telescopic and can be extended out in an extended position or retracted into each other in a withdrawn position. The connections points 44–45 have eyelets 47 for running a line, rope, wire, etc. The mast 40 is shown to have three extendable portions 41–43, however this number is arbitrary and could be one, two, four or five portions, for example. Of course a single piece mast 40 would not be telescopic.

The mast 40 is made of carbon fiber and this provides a strong yet light mast 40. It is noted that the use of carbon fibers in fishing outriggers is not believed to be known in the industry and is critical to the invention. The carbon fiber mast 40 is lightweight and therefore, small compact, electrical motors can be used to maneuver the mast 40. In contrast, heavy hydraulic systems are generally required in prior art outriggers because prior art mast are made from metal such as aluminum and stainless steel resulting in significant weight. The use of carbon fiber also allows the fishing system to dispense with guide (guy) wires and spreaders for tensioning the guide wires to provide additional support to the prior art mast. The prior art guide wires and spreaders also undesirably increase the weight of the prior art outriggers. In addition, due to the high strength properties of carbon fiber the mast 40 is less likely to be flexed during operation and therefore does not routinely spring back and provides a more effective fishing system than prior art masts formed of metal. In other words, the prior art outriggers pulled the fishing bait unnaturally out of the water during a spring back motion of the outrigger.

The property of the carbon fiber mast 40 naturally duplicates the effect of swimming fish. In other words, the bait fish duplicates a swimming motion of live fish due to the fact that the carbon fiber is manufactured with a predetermined amount of flexibility and rigidity superior to that possible in prior art metal outriggers. The flexibility and rigidity can be customized by adding or subtracting fiber threads from the carbon fiber. In addition, each of the sections 41–43 of the mast 40 can have different qualities in regards to flexibility and strength. A mast with varying rigidity and flexibility is not believed to be known in the prior art. Therefore, a carbon fiber mast or pole can be configured for different jobs.

The lower extendable portion 43 has a locking arm 46 (FIG. 2) that contains the clasping mechanism 39 for locking with the locking mechanism 3.

The lower extendable portion 43 locks to a base part 48 that is in turn supported in a housing 49 such as a gimble tube 49 (see FIGS. 2 and 5). The base part 48 is supported in the gimble tube 49 so as to be rotatable within the gimble tube 49. The base part 48 extends through the gimble tube 49 and has an end that extends out of the other side of the gimble tube 49. In addition, a seal 56 (FIG. 2) is provided between the gimble tube 49 and the base part 48 to protect the parts from the environment. The lower extendable portion 43 is locked to the base part 48 by a pin 57 (FIG. 1) and is quickly releasable from the base part 48 for changing out the mast 40 or for maintenance purposes.

The gimble tube 49 has trunions 50 that rotate in bearing journals 51 of a holding plate 52 (see FIGS. 3, 4 and 5). In this manner, the gimble tube 49 can pivot about an opening 53 formed in the holding plate 52. The holding plate 52 is secured to the boat body 13 by fasteners 54 such as screws, rivets, and bolts (FIG. 6). The gimble tube 49 can pivot via the trunions 50 and therefore, the mast 40 can be lowered or raised. For instance, the mast 40 would be lowered when the boat is going under a bridge. FIG. 3 shows the outrigger 2 in the raised and locked position and FIG. 4 shows the outrigger 2 in the lowered position. Arrow 70 shows the direction of movement of the mast 40 between the raised and lowered positions.

A cover 55 is provided for protecting the opening 53 and the control electronics 4 provided below (FIG. 6). The cover 55 is formed from a flexible material such as rubber to so as not to interfere with the raising and lowering of the mast 40.

The fishing system is provided with control electronics 4 in order to fully automate the fishing system. FIGS. 4 and 5 show slightly different physical embodiments of the control electronics 4. However, it is understood that the components and connections can be varied from the embodiments shown as long as the major components and related functions are provided. The control electronics 4 include a first actuator 60 connected to a first clamping arm 62 and a second clamping arm 65. The first clamping arm 62 is clamped around the base part 48 that in turn supports the mast 40. The second clamping arm 65 is connected to the gimble tube 49 and thereby the first actuator 60 is supported by the gimble tube 49. After the switch 19 releases the outrigger 2 from the locking mechanism 3, and with continued actuation of the switch 19, the first actuator 60 rotates the support part 48 within the gimble tube 49 by turning the first clamping arm 62. In this manner, the outer rigger 2 is rotatable as shown by a double-headed arrow 63 (FIG. 1). Therefore, the outrigger 2 can be rotated away from the side of the boat and out over the water. In reverse actuation of the switch 19, the outrigger 2 can be rotated back to the boat and locked to the locking mechanism 3.

FIGS. 3, 4 and 5 show a second actuator 64 connected to the holding plate 52 by a clamp 66. The second actuator 64 is connected to the gimble tube 49 by an arm 68 attached to a clasp 69 of the gimble tube 49. The second actuator 64 is controlled by a second switch 67 (see FIG. 1). By actuation of the second switch 67, the gimble tube 49 is pivoted via the trunions 50 by the second actuator 64. In this manner the mast 40 is raised and lowered (in contrast to being rotated). Power is provided by the electrical system of the boat. However, a separate battery can also be provided if necessary. It is noted that the second actuator 64 is optional and that the outrigger 2 can be raised and lowered manually.

In summary, the invention is a fishing system formed of the outrigger 2, the locking mechanism 3 and the control electronics 4. The outrigger 2 is preferably formed of carbon fiber that makes it lightweight and has superior flexibility and rigidity properties. The carbon fiber outrigger 2 results in an easy to maneuver outrigger 2, an outrigger that requires smaller electrical and electronic components, and an outrigger that replicates natural swimming behavior of bait. In addition, the fishing system could be implement manually and the two actuators 60, 64 can be dispensed with. It is noted that the outrigger 2 and the locking mechanism 3 can be sold as stand alone units and do not have to be sold exclusively in the fishing system.

I claim:

1. A fishing system to be mounted to a boat, the fishing system comprising:
   a housing;
   a mast having a mast axis and disposed in said housing;
   a first actuator connected to and rotating said mast about said mast axis, said first actuator mechanically connected to and supported by said housing; and
   a second actuator connected to and pivoting said housing for raising and lowering said mast.

2. The fishing system according to claim 1, including a holding plate to be physically attached to the boat, said housing pivotably mounted in said holding plate such that said mast can be raised and lowered by said second actuator.

3. The fishing system according to claim 2, wherein said holding plate has bearing journals, and said housing has trunions supported by and rotatable within said bearing journals such that said housing is pivotable.

4. The fishing system according to claim 2, wherein said second actuator is coupled to said holding plate.

5. The fishing system according to claim 2, including a locking mechanism for securing said mast, said locking mechanism to be attached to the boat, and said mast having a clasping mechanism engaged and secured by said locking mechanism.

6. The fishing system according to claim 1, wherein said mast is formed from carbon fiber.

7. The fishing system according to claim 1, wherein said mast is formed of three parts, including a first part, a second part and a third part, which are telescopically connected to each other such that in a first position said third part is extendable from and locked to said second part and in a second position said third part is partially retracted into said second part.

8. The fishing system according to claim 7, wherein in a third position said second part is extendable from and locked to said first part and in a fourth position said second part is partially retracted into said first part.

9. The fishing system according to claim 1, wherein said first actuator and said second actuator are electrical actuators.

10. The fishing system according to claim 2, including a base part having a first end connected to said mast and a second end rotatably supported in said housing, said first actuator connected to and rotating said base part resulting in the rotation of maid mast.

11. The fishing system according to claim 5, wherein said locking mechanism has a base secured to the boat, a pivotable body pivotable mounted in said base, a third actuator with a pin mounted on said base, and a clasping mechanism extending from said pivotable body and engaging said clasping mechanism of said mast, when actuated said pin of said third actuator pivots said pivotable body such that said clasping mechanism of said locking mechanism disengages from said clasping mechanism of said mast.

12. The fishing system according to claim 11, wherein said locking mechanism has a spring disposed between said base and said pivotable body for biasing said pivotable body to a locked position.

13. The fishing system according to claim 11, wherein said clasping mechanism is part of an adjustable arm adjustable connected to said pivotable body.

14. The fishing system according to claim 13, wherein said adjustable arm has a threaded end and said pivotable body has a threaded end for receiving said threaded end of said adjustable arm, in this manner, said adjustable arm can be moved to and from said pivotable body.

15. The fishing system according to claim 4, including a clamp having a first end connected to said holding plate and a second end supporting said second actuator.

16. The fishing system according to claim 15, wherein said holding plate has an opening formed therein and said housing projects through said opening.

17. The fishing system according to claim 16, including a cover surrounding said housing above said opening in said holding plate.

18. The fishing system according to claim 17, wherein said cover is formed of a flexible material.

19. The fishing system according to claim 7, including at least two eyelets disposed on said mast for guiding a line, rope or wire.

20. The fishing system according to claim 10, wherein said housing is a gimble tube, said first actuator has a first clasping arm connected to said base part and a second clasping arm connected to and supported by said gimble tube.

21. An outrigger for a boat, comprising:

a mast formed of carbon fiber, said mast being formed of three parts, including a first part, a second part, and a third part being telescopically connected to each other, said first part having rigidity and flexibility properties being different than said second part and said third part due to different compositions of said carbon fiber forming said three parts; and a base part having a first end connected to the boat and a second end supporting said mast.

22. The outrigger according to claim 21, including a pin releasably holding said mast to said base part.

* * * * *